United States Patent [19]
Suissa et al.

[11] Patent Number: 5,694,319
[45] Date of Patent: Dec. 2, 1997

[54] PROCESS FOR THE DETERMINING TRAVEL-SITUATION-DEPENDENT STEERING ANGLE

[75] Inventors: Avshalom Suissa, Leonberg; Friedrich Böttiger, Stuttgart; Rudolf Lorenz, Ebersbach, all of Germany

[73] Assignee: Daimler-Benz AG, Germany

[21] Appl. No.: 746,306

[22] Filed: Nov. 8, 1996

Related U.S. Application Data

[63] Continuation of Ser. No. 105,970, Aug. 13, 1993, abandoned.

[30] Foreign Application Priority Data

Aug. 13, 1992 [DE] Germany ............ 42 26 746.3

[51] Int. Cl.$^6$ ................................ B60T 8/24
[52] U.S. Cl. ............... 364/424.051; 364/426.016; 303/140; 303/146
[58] Field of Search .............. 364/424.05, 424.051, 364/424.052, 426.016; 180/132, 140, 141, 142, 79.1; 280/91; 303/139, 140, 146, 147

[56] References Cited

U.S. PATENT DOCUMENTS

| | | | |
|---|---|---|---|
| 4,690,431 | 9/1987 | Ito et al. | 180/140 X |
| 4,718,685 | 1/1988 | Kawabe et al. | 280/91 |
| 4,767,588 | 8/1988 | Ito | 364/424.05 |
| 4,809,181 | 2/1989 | Ito et al. | 364/426.01 |
| 4,840,489 | 6/1989 | Kawabe et al. | 280/91 |
| 4,901,811 | 2/1990 | Uno et al. | 180/140 |
| 4,967,865 | 11/1990 | Schindler | 180/79.1 |
| 5,001,636 | 3/1991 | Shiraishi et al. | 364/424.05 |
| 5,019,982 | 5/1991 | Furukawa | 364/424.05 |
| 5,206,808 | 4/1993 | Inoue et al. | 364/424.05 |
| 5,208,751 | 5/1993 | Berkefeld | 364/424.05 |
| 5,228,757 | 7/1993 | Ito et al. | 303/100 |
| 5,229,944 | 7/1993 | Yasuno | 364/426.01 |
| 5,267,160 | 11/1993 | Ito et al. | 364/424.05 |
| 5,303,989 | 4/1994 | Yasuno et al. | 303/111 |
| 5,332,300 | 7/1994 | Hartmann | 303/100 |
| 5,333,058 | 7/1994 | Shiraishi et al. | 364/424.05 |
| 5,341,296 | 8/1994 | Yasuno et al. | 364/426.01 |

FOREIGN PATENT DOCUMENTS

| | | |
|---|---|---|
| 3608420 | 9/1985 | Germany . |
| 3625391 | 8/1987 | Germany . |
| 4010332 | 10/1990 | Germany . |
| 4030653 | 4/1992 | Germany . |
| 4031304 | 4/1992 | Germany . |
| 2263180 | 1/1992 | United Kingdom . |

*Primary Examiner*—Collin W. Park
*Attorney, Agent, or Firm*—Evenson, McKeown, Edwards & Lenahan, P.L.L.C.

[57] ABSTRACT

A process is provided for determining a travel-situation-dependent steering angle, in which a specification of a characteristic value for the transverse motion of the vehicle is given, the actual value of the yaw angular velocity of the vehicle is evaluated, and a criterion is derived as a function of the actual value of the yaw angular velocity as well as the predetermined characteristic value. As a function of the criterion, an influencing of the travel behavior of the vehicle takes place by an intervention in the vehicle steering. For the derivation of the criterion, additionally the side slip angle, the steering angle and the vehicle velocity are evaluated, and, for the derivation of the criterion, the lateral forces at the vehicle wheels are taken into consideration.

10 Claims, 2 Drawing Sheets

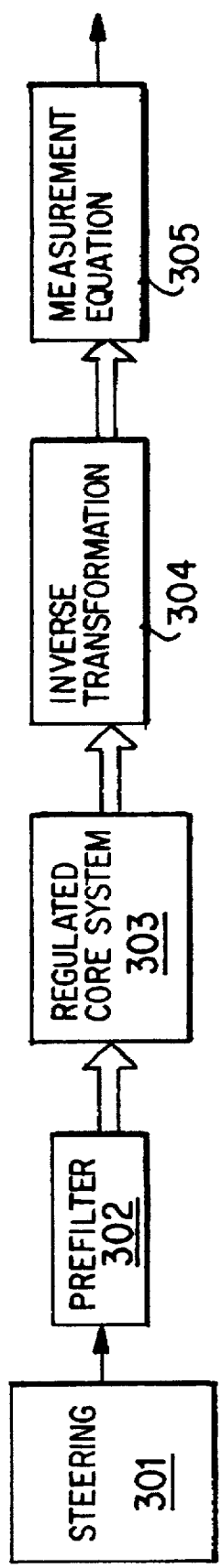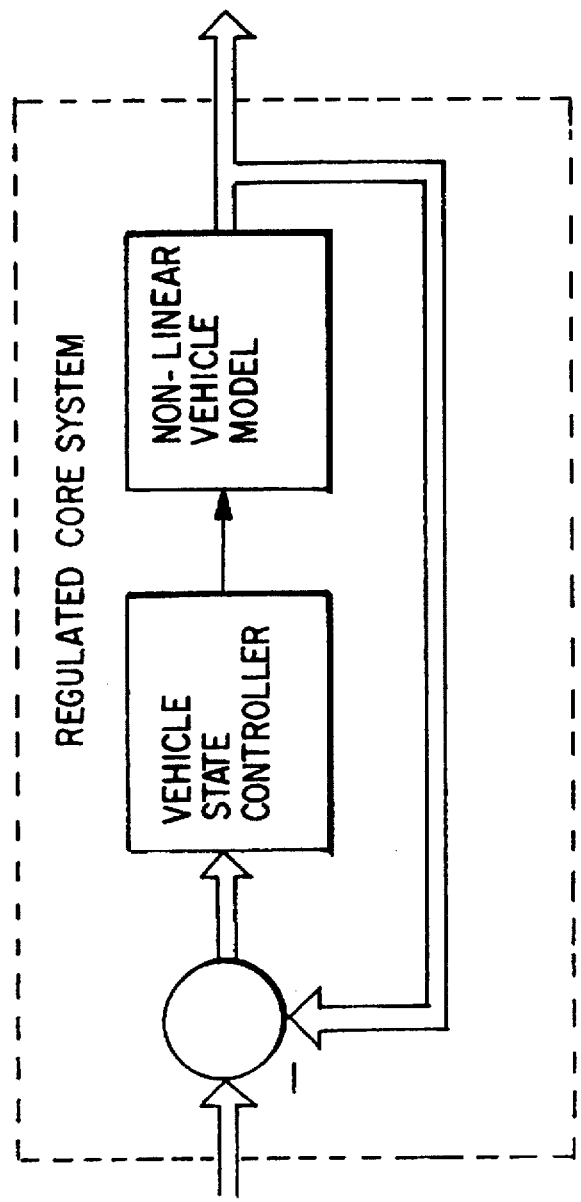

PROCESS FOR THE DETERMINING TRAVEL-SITUATION-DEPENDENT STEERING ANGLE

This is a continuation of application Ser. No. 08/105,970, filed on Aug. 13, 1993, now abandoned.

BACKGROUND AND SUMMARY OF THE INVENTION

The present invention relates to a process for the determination of a travel-situation-dependent steering angle giving a specification of a characteristic value for transverse motion of the vehicle; evaluating an actual value of yaw angular velocity of the vehicle; deriving a criterion as a function of the actual value of the yaw angular velocity as well as a predetermined characteristic value, and, as a function of the criterion, influencing travel behavior of the vehicle by an intervention in steering of the vehicle.

DE 3,625,392 A1 discloses a process of the aforementioned general type, according to which the actual value of the yaw angular velocity of the vehicle is compared with the desired value of the yaw angular velocity of the vehicle. In the event of the deviation of the actual value from the desired value, it is described that for the purpose of stabilizing the travel behavior of the vehicle an intervention in the steering of the vehicle may take place. Likewise, by influencing the speed of rotation of the vehicle wheels, a stabilization of the travel behavior can take place. The yaw, angular velocity is measured during this process.

DE 3,608,420 A1 discloses a process for the determination of the side slip angle and similar dynamic quantities from the quantities of steering wheel angle, vehicle speed, yaw velocity and yaw acceleration by way of a plurality of mathematical models. In this way, the travel behavior of the vehicle is to be controlled as a function of the steering wheel angle and of the vehicle speed.

A process for the determination of the slip angles and/or of the lateral drive forces of a braked vehicle is disclosed in DE 4,030,653 A1. There, the slip angle and/or the lateral drive forces are determined from the wheel speed, steering angle, yaw velocity and applied braking pressure quantities with the use of a simplified vehicle model.

An example of a model-assisted estimation of the side slip angle can be found in DE 4,031,304 A1. The transverse speed of the vehicle is estimated using a model-assisted procedure by way of the vehicle longitudinal speed, yaw angular velocity and steering wheel angle quantities.

Furthermore, it is known from DE 4,010,332 A1 to regulate the vehicle yawing moment which occurs in the course of a braking operation. A controlled intervention takes place both in the steering and also in the brakes, so that a breakaway of the vehicle from the track is prevented. Desired values for yaw velocity and transverse acceleration are computed from the vehicle speed and steering wheel angle.

An object of the present invention is to improve a process for the determination of a travel-situation-dependent steering angle such that a value of the steering angle can be determined with the lowest possible hardware expenditure.

In the case of a process for the determination of a travel-situation-dependent steering angle, this object has been achieved according to the present invention by providing that the step of deriving the criterion includes evaluating side slip angle, steering angle and vehicle velocity, and considering lateral forces at the wheels of the vehicle.

In terms of effect, it is advantageous that the vehicle dynamic behavior can be altered. In this case, skidding, a critical driving situation, can be reliably prevented without reducing lateral forces. Consequently, the vehicle can be held at the point of maximum transverse acceleration $a_q$.

Advantages of the present invention as compared with conventional control processes reside in that, upon reaching the lateral force maximum of the vehicle axle wheels, the travel behavior of the vehicle can be influenced, by influencing the speed of the individual wheels, so that the lateral force maximum is also reached at the other axle, and accordingly the maximum possible transverse acceleration is also reached.

If this influencing of the speed of the wheels takes place by an intervention in the brakes, an additional advantageous result is a slowing down of the vehicle.

The process of the present invention is based on a model of a vehicle which includes the yaw angular velocity $d\phi/dt$ and the side slip angle $\beta$. It is then possible to determine therefrom a value of the wheel steering angle $\delta_R$. On this basis, these three quantities form the essential variables of state of the system.

It is possible to determine therefrom an output variable y as a function of the vehicle speed v. The dependence of the output variable upon the aforementioned variables of state as well as the vehicle speed v is dependent on which actuating element is employed for specifying a desired value by the driver (steering wheel, joystick, etc.). The selection of the output variable represents a compromise between sensitivity and actuation complexity. The specification of the desired value can also take place by a regulating device which effects automatic driving of the vehicle. As a function of the selected output variable, sensors must also be provided, in order to be able to determine the output variable.

In one embodiment of the present invention, a selection of the output variable y can be the following:
y=(dβ/dt−dφ/dt)*v (as transverse acceleration) or
y=(dβ/dt−dφ/dt)/v (as curvature). Likewise, it is however also feasible to specify y=δ or y=β or y=dφ/dt, or other speed-dependent functions of these quantities.

In the vehicle model, the vector of state $x=(x_1, x_2, \ldots, x_n)^T$ with, for example, $x_1=d\phi/dt$, $x_2=\beta$ and $X_3=\delta_R$ is subjected to a nonlinear transformation $z=T(x)$. As a result of this, the vehicle model is converted into a so-called nonlinear regulation standard form.

$$dz_1/dt = z_2 \quad (1)$$
$$dz_2/dt = z_3$$
$$\vdots$$
$$dz_n/dt = f(z) + G(z) * d\delta_R/dt.$$

Using a law of the form:

$$d\delta_R/dt = (-f(z)+\tau)*G^{-1}(z) \quad (2)$$

in this nonlinear regulation standard form the nonlinearities f(z) and G(z) are compensated and the result is a linear core system, which comprises a series circuit of n integrators.

$$dz_1/dt = z_2 \quad (3)$$
$$dz_2/dt = z_3$$
$$\vdots$$
$$dz_n/dt = \tau.$$

For the system which is thus established, a rule of state $$\tau = R(z_{desired} - z) \quad (4)$$

is formulated, by which the desired dynamic behavior is generated. In this case, the desired dynamics are achieved by specifying the pole. Likewise, the desired dynamic behavior can be achieved by a known matrix Riccati pattern.

In a currently contemplated embodiment of the invention, the quantity $Z_{desired}$ is generated by a prefilter from the command variable w. In this case, the prefilter is configured so that the selected output variable, y coincides on a steady basis with the command variable w. This is only possible as long as the lateral forces required for this purpose are not greater than the maximum possible lateral forces. If the required lateral forces are greater, then the output variable y remains smaller than the command variable w, but of such magnitude that the lateral force maximum is reached at least at one axle and is held stable.

In the case of a non-neutral vehicle behavior, i.e. if this lateral force maximum is not reached at the same time at both axles, an unused lateral force reserve $S_{res}$ exists accordingly at one axle. In order to utilize this lateral force reserve $S_{res}$, it is now possible to construct an additional circumferential force difference $\delta U$, which generates a moment about the vertical axis:

$$M_z = s_B * \delta U / 2 \tag{5}$$

In this equation, $s_B$ is the track width of the vehicle.

In the equilibrium condition, the following is then applicable:

$$l_v * S_{v,max} - l_h * S_{h,max} + M_z = 0 \tag{6}$$

(5) and (6) give the following:

$$\delta U = \frac{2 * (l_h * S_{h,max} - l_v * S_{v,max})}{s_B} \tag{7}$$

For example, by regulation or control of the braking pressure difference $\delta p$ at the sides of the vehicle, it is possible to generate this circumferential force $\delta U$. The braking pressure difference obtained therefrom is as follows:

$$\delta p = \frac{1}{K_p} * \delta u, \tag{8}$$

where $K_p$ can assume, for example, the value 83 N/bar.

If the front axle has reached the maximum, the braking pressure difference $\delta p$ is applied at the rear axle such that the higher braking pressure prevails at the rear wheel at the inside of the curve. If the rear axle has reached the maximum, the braking pressure difference is applied at the front axle with the higher braking pressure at the front wheel which is on the outside of the curve.

In the description which follows, the conditions are explained in greater detail with reference to a single track vehicle model with two degrees of freedom (yaw and floating). In this case, the model is based on a vehicle with front wheel steering.

Firstly, the symbols employed in this specification are:
β side slip angle
dφ/dt Yaw angular velocity
v Longitudinal velocity
$S_v$ Lateral force at the front axle
$S_h$ Lateral force at the rear axle
U Circumferential force
$\alpha_v$ Tire slip angle, front
$\alpha_h$ Tire slip angle, rear
m Vehicle mass
$I_z$ Moment of inertia with respect to the vertical axis of the vehicle at the center of gravity
$l_v$ Distance from front axle to the center of gravity of the vehicle
$l_h$ Distance from rear axle to the center of gravity of the vehicle
$s_B$ Track width
μ Coefficient of friction
σ Longitudinal slip
ε Total slip
$P_N$ Normal force (normal reaction).

The tire slip angles are found from the following equations:

$$\alpha_v = \delta_R = \beta - (l_v * d\phi/dt)/v)/v \tag{10}$$

$$\alpha_h = \beta + (l_h * d\phi/dt)/v \tag{11}$$

An analytical representation of the lateral forces then emerges according to the following equations:

$$S_i = \left[ \frac{a * \epsilon_i}{1 + \frac{b}{\mu^2} * \epsilon_i} + \mu * c * \tan^{-1}(d\epsilon_i/d\mu) \right] * \frac{\sin(\alpha_i)}{\epsilon_i} * P_N \tag{12}$$

with $\epsilon_i = \sqrt{(\sin^2(\alpha_i) + \sigma^2)}$ .

The value μ can be measured, estimated or identified. Moreover, v or h is to be inserted for the index i. The quantities a, b, c and d are constants, which may assume the following values:
a=4.5; b=49; c=0.477; d=9.33 and $P_N$=approx. 8000–10000 N.

Alternatively, the lateral guiding forces can also be determined as a function of quantities which relate to the vehicle geometry as well as the yaw angular acceleration, the transverse acceleration and the steering angle.

Proceeding from the two equations which describe the force and torque balance:

$$m * a_q = S_v * \cos(\delta) + S_H + U_v * \sin(\delta)$$

$$I_z * d^2\phi/dt^2 = l_v * S_v * \cos(\delta) - l_h * S_h + s_B * \delta U$$

the result is the following equations for the computation of the lateral guiding forces:

$$S_v = \frac{l_h * (m * a_q - U_v * \sin(\delta)) + I_z * d^2\phi/dt^2 - s_B * \delta U}{L * \cos(\delta)}$$

$$S_h = \frac{l_v * (m * a_q - U_v * \sin(\delta)) - (I_z * d^2\phi/dt^2 - s_B * \delta U)}{L}$$

In this case, the circumferential forces at the front and rear $U_v$ and $U_h$ can be estimated from the braking pressures or the throttle valve setting, or they can be disregarded.

In this case, the transverse dynamics of the vehicle are described by the following equations:

$$\frac{d\beta}{dt} = \frac{d\Phi}{dt} - \frac{S_v(\alpha_v, \mu, \sigma) * \cos(\delta_R) + S_h(\alpha_h, \mu, \sigma)}{m * v} \tag{13}$$

$$\frac{d^2\Phi}{dt^2} = \frac{l_v * S_v(\alpha_v, \mu, \sigma) * \cos(\delta_R) - l_h * S_h(\alpha_h, \mu, \sigma)}{I_z} + \frac{s_B * \delta U}{2 * I_z} \tag{14}$$

$$d\delta_R/dt = u. \tag{15}$$

The quantity u is the regulated quantity.

Without any restriction upon generality, the following simplifications are adopted:

$\cos(\delta)=1$, the lateral forces are free from delay, the actuating system dynamics can be disregarded, the vehicle velocity v is treated as quasi constant, the slip α is equal to 0 and the coefficient of friction μ is 1.

In order now to arrive at a transformed vehicle model corresponding to equation (1), the following principle is applied:

$$z_1 = c_1 * \beta + c_2 * d\phi/dt \qquad (16)$$

The transformation, which converts the model corresponding to the equations (13), (14) and (15) into the form of equation (1), is then obtained by multiple application of the differential operator N to the function $z_1(x)$.

$$Nz_i(x) := \left[ \frac{dz_i(x)}{dx} \right]^T * \frac{dx}{dt} \qquad (17)$$

The result is then the following system of equations (18):

$$z_1(x) = c_1 * \beta + c_2 * d\phi/dt$$

$$z_2(x) = Nz_1(x) = c_1 * d\beta/dt + c_2 * d^2\phi/dt^2 = c_1 * d\phi/dt - c_4 * S_h$$

$$z_3(x) = N^2 z_1(x) = c_1 * d^2\phi/dt^2 - c_4 * dS_h/dt = S_h{'} * c_4 * (d\phi/dt + c_8 * S_v + c_7 * S_h) + c_1{}^2 * S_v - c_1 * c_3 * S_h.$$

The selection of $z_1$ is obtained so that, in the case of threefold application of N to $z_1$, the regulated quantity u appears the first time. If the differential operator N is applied to $z_3$, then the regulated quantity u appears the first time. The comparison with equation (1) then gives the desired functions G(z) and f(z).

$$G = (c_3 * c_4 * S_h{'} + c_2{}^2) * S_v{'} \qquad (18)$$

$$f = a_1 * z_2 + a_2 * z_3 + a_3 * Z_2{}^2 \qquad (19)$$

In this case, the following are applicable:

$c_1 = 1/l_z$
$c_2 = 1/(m*v)$
$c_3 = l_h/l_{zh}$
$c_4 = (l_v + l_h)/(m*v*l_z)$
$c_5 = (2/m - (l_v*1)/l_z)/(l_v*m*v^2)$
$c_6 = (1 - (m*l_v{}^2)/l_z)/(m*v)$
$c_7 = (1 + (m*l_h{}^2)/l_z)/(m*v)$
$c_8 = (1 - (m*l_v*l_h)/l_z)/(m*v)$
$a_1 = c_1 * S_v{'} - c_3 * S_h{'} + c_5 * S_h{'} * S_v{'}$
$a_2 = c_6 * S_v{'} - c_7 * S_h{'}$
$a_3 = (1/C_1)^2 * S_h{''}$
$S_h{'} = dS_h/d\alpha_h$
$S_v{'} = dS_v/d\alpha_v$
$S_h{''} = d^2 S_h/d\alpha_h{}^2$
$1 = l_v + l_h + l_h$ If a linear regulator of state according to equation (2) is applied:

$$\tau = R(z_{desired} - z) = (\alpha_0 \alpha_i \alpha_2) * (z_{desired} - z) = \qquad (20)$$
$$= \alpha_0 * (z_{1desired} - z_1) + \alpha_1 * (z_{2desired} - z_2) + \alpha_2 * (z_{3desired} - z_3),$$

then the regulating law emerges as follows:

$$d\delta_v/dt = G^{-1} * (-f + \alpha_2 * (z_{3desired} - z_3) + \alpha_1 * (z_{2desired} - z_2) + \alpha_0 * (z_{1desired} - z_1)) \qquad (21)$$

The coefficients $\alpha_0$, $\alpha_1$ and $\alpha_2$ are freely selectable and serve to specify the desired characteristic polynomial (specification of pole) and thus the temporal behavior of the automatic control system.

BRIEF DESCRIPTION OF THE DRAWINGS

These and further objects, features and advantages of the present invention will become more apparent from the following detailed description thereof when taken in conjunction with the accompanying drawings wherein:

FIG. 3 is a block circuit diagram for steering regulation; and FIG. 4 is a detail of the block circuit diagram of FIG. 3.

DETAILED DESCRIPTION OF THE DRAWINGS

Figure 1:
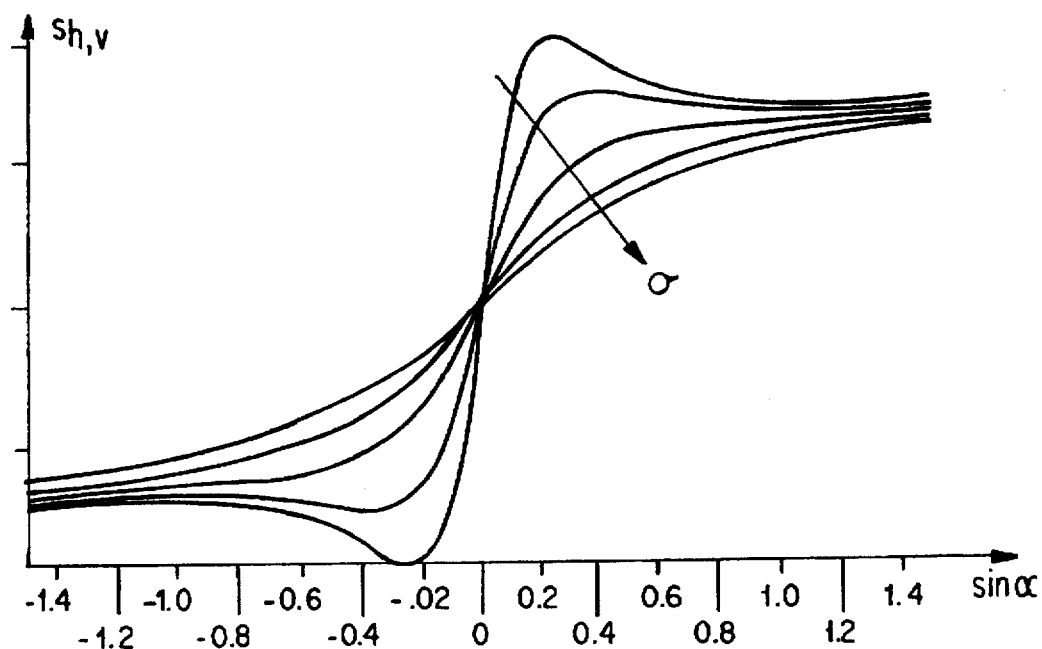
FIG. 1 is a tire performance graph of the lateral force S against the tire slip angle $\alpha$.

FIG. 1 shows the plot of the lateral force of a wheel against the sine of the tire slip angle $\alpha$, with the longitudinal slip $\sigma$ serving as the parameter. This representation corresponds to the above equations (12).

Figure 2:
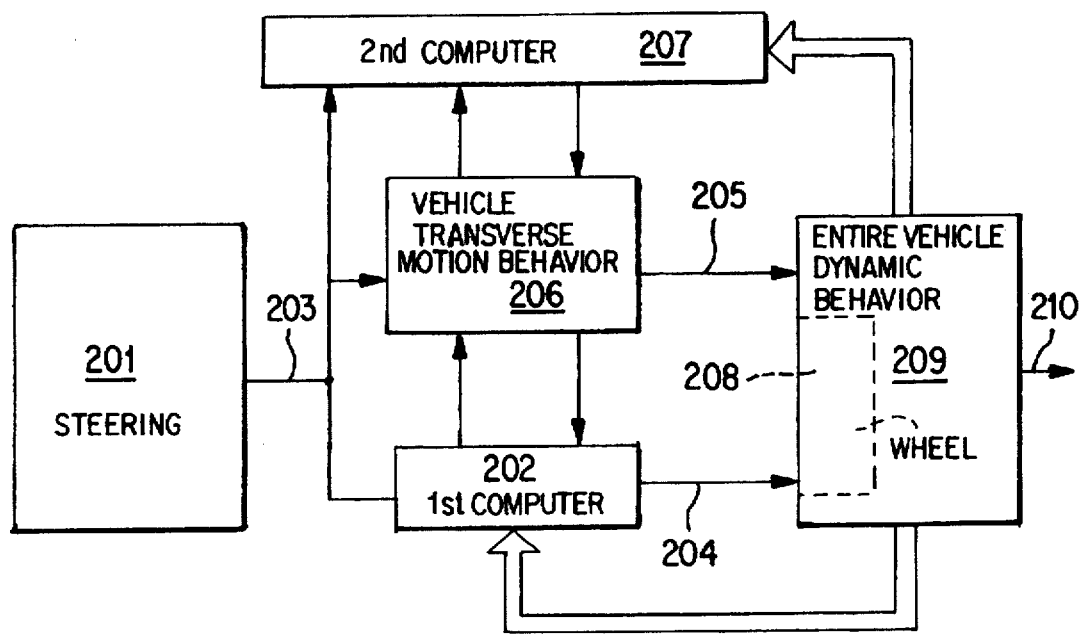
FIG. 2 is a block circuit diagram which represents the total function of the regulator.

According to FIG. 2, a desired value of the transverse motion is determined by a device 201. This desired value can be predetermined by the driver and/or by a regulating system which permits automatic driving. From this device 201, a signal 203 which represents the desired value is then output to the computing device 202, which outputs a desired value of the steering angle $\delta$ in the form of a signal 204. This steering angle is then set at the wheels, as is represented by the block 208. This steering angle at the wheels has effects on the dynamic behavior of the entire vehicle in accordance with the representation by the block 209. It is then, in turn, possible to measure an output variable y, as is represented by the signal 210. The dynamic behavior corresponding to the block 209 is described by a vector of state x, which is in turn fed to the computing device 202 as well as to a further computing device 207. In this further computing device 207, criteria are then examined as to whether influencing the speeds of rotation of vehicle wheels is desirable, in which, case then, driven by the further computing device 207, if required, the transverse motion behavior of the vehicle is influenced by influencing the rotational speeds of the wheels corresponding to block 206. As shown by the arrow 205, this also has effect on the dynamic behavior of the entire vehicle.

FIG. 3 shows a block circuit diagram concerning the steering regulation. In this diagram, the block 301 corresponds to the block 201. Corresponding to the block 302 by way of a prefilter which represents a reference model for the dynamic behavior of the regulated vehicle, a desired value $z_{desired}$ is generated in the transformed system from the command variable w. In this case, the block 303 corresponds to the regulated core system in the transformed representation. In the formal representation, the output variable y is then obtained by the inverse transformation corresponding to the block 304 as well as the measurement equation corresponding to the block 305. Because of the model formation as well as the transformation, the inverse transformation does not however need to be known explicitly, since, as shown in the description, the regulated quantity is obtained by comparison (see above equations (18) and (19)). The regulating law is then obtained, in the illustrative embodiment shown, in accordance with above equation (21).

FIG. 4 shows the standard block diagram of a multivariable automatic control system, according to which the regulation of the core system takes place in a manner corresponding to the block 303 of FIG. 3.

Preferably, in the present process, the yaw angular velocity $d\phi/dt$, is measured. In this case, the side slip angle $\beta$ can be observed, as has for example been described in DE-A 42 46 746.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A process for determination of a travel-situation-dependent steering angle of a vehicle, comprising the steps of specifying a characteristic value for transverse motion of the vehicle based upon yaw angular velocity and floating angle; determining an actual value of yaw angular velocity of the vehicle; deriving a criterion, based upon a non-linear relationship between lateral wheel forces and the floating angle, as a function of the actual value of the yaw angular velocity and the characteristic value; determining the travel-situation-dependent steering angle as a function of the derived criteria; and intervening in steering of the vehicle via brake control utilizing the travel-situation-dependent steering angle and the non-linear relationship to prevent vehicle instability during a critical driving state.

2. The process according to claim 1, wherein the step of deriving includes taking into consideration the lateral wheel forces at least as a function of one of tire slip angles, yaw angular acceleration, and transverse acceleration.

3. The process according to claim 1, wherein the criterion is derived by transforming a vehicle model into a nonlinear regulation standard form, and with reference to this form, the steering angle is utilized as a regulated quantity in the regulating system.

4. The process according to claim 3, wherein the step of deriving includes taking into consideration the lateral wheel forces at least as a function of one of tire slip angles, yaw angular acceleration, and transverse acceleration.

5. The process according to claim 1, wherein the influencing of the vehicle travel behavior occurs in a transverse direction and includes brake control in individual wheel brakes in one axle.

6. The process according to claim 5, wherein the step of deriving includes taking into consideration the lateral wheel forces at least as a function of one of the tire slip angles, yaw angular acceleration and also of transverse acceleration.

7. The process according to claim 6, wherein the criterion is derived by transforming a vehicle model into a nonlinear regulation standard form, and with reference to this form, the steering angle is utilized as a regulated quantity in the regulating system.

8. The process according to claim 5, wherein, upon reaching one of a lateral force maximum at one axle and a previously specified maximum slip angle, brake control in individual wheel brakes of a second vehicle axle is effected.

9. An apparatus for determining a travel-situation-dependent steering angle of a vehicle, comprising means for specifying a characteristic value for transverse motion of the vehicle based upon yaw angular velocity and floating angle; means for evaluating an actual value of yaw angular velocity of the vehicle; means for deriving a criterion, based upon a non-linear relationship between lateral wheel forces and the floating angle, as a function of the actual value of the yaw angular velocity and the characteristic value; means for determining the travel-situation-dependent steering angle as a function of the derived criteria; and means for intervening in steering of the vehicle via brake control utilizing the non-linear relationship and the travel-situation-dependent steering angle to prevent vehicle instability during a critical driving state.

10. The apparatus according to claim 9, wherein the deriving means includes taking lateral wheel forces into consideration at least as a function of one of tire slip angles, yaw angular acceleration and transverse acceleration.

* * * * *